United States Patent [19]
Brown et al.

[11] Patent Number: 5,682,274
[45] Date of Patent: Oct. 28, 1997

[54] METHOD AND APPARATUS FOR POSITIONING TRANSDUCERS TO CORRECT FOR READ AND WRITE ELEMENT MISREGISTRATION OFFSETS WHICH VARY DEPENDENT ON ROTARY ACTUATOR ANGULAR POSITION ACROSS A DISK MEDIUM

[75] Inventors: Dana Henry Brown; Earl Albert Cunningham; Kevin Jack Erickson; Richard Hunt Estry; Thomas William Glaser; Mark David Hagen; Hal Hjalmar Ottesen; Dean Curtis Palmer; John Jeffrey Stephenson, all of Rochester, Minn.

[73] Assignee: International Business Machines Corporation, Armonk, N.Y.

[21] Appl. No.: 392,276

[22] Filed: Feb. 22, 1995

Related U.S. Application Data

[60] Continuation of Ser. No. 143,557, Oct. 26, 1993, abandoned, which is a division of Ser. No. 591,596, Oct. 2, 1990, abandoned.

[51] Int. Cl.$^6$ .................................................. G11B 5/596
[52] U.S. Cl. ........................ 360/77.04; 360/77.08
[58] Field of Search ............................ 360/76, 77.04, 360/77.02, 78.08, 77.08

[56] References Cited

U.S. PATENT DOCUMENTS

| | | | |
|---|---|---|---|
| 4,388,655 | 6/1983 | Zenzefilis | 360/19.1 |
| 4,633,343 | 12/1986 | Maury et al. | 360/76 |
| 4,802,033 | 1/1989 | Chi | 360/77.04 |
| 4,945,427 | 7/1990 | Cunningham | 360/75 |
| 4,969,059 | 11/1990 | Volz et al. | 360/77.04 X |
| 5,073,833 | 12/1991 | Best et al. | 360/77.04 X |
| 5,235,478 | 8/1993 | Hoshimi et al. | 360/77.08 |

*Primary Examiner*—W. R. Young
*Assistant Examiner*—James L. Habermehl
*Attorney, Agent, or Firm*—Richard E. Billion; Roy W. Truelson

[57] ABSTRACT

An apparatus and method for correcting for track misregistration when a slider or head assembly contains a separate read element and write element. The offset is determined at a first position and at a second position of the actuator arm assembly. From these offsets a constant and a multiplier are determined for determining an offset as a function of the cylinder location. Also disclosed is a method and apparatus for minimizing distance traveled to prevent misregistration when repositioning between the read element and a write element. The read element is intentionally offset from the write element at an angle so as to minimize the distance traveled across the disk.

18 Claims, 6 Drawing Sheets

METHOD AND APPARATUS FOR POSITIONING TRANSDUCERS TO CORRECT FOR READ AND WRITE ELEMENT MISREGISTRATION OFFSETS WHICH VARY DEPENDENT ON ROTARY ACTUATOR ANGULAR POSITION ACROSS A DISK MEDIUM

CROSS REFERENCE TO RELATED APPLICATION

This application is a continuation of applicants' prior application Ser. No. 08/143,557, filed Oct. 26, 1993, now abandoned, which is a division of application Ser. No. 07/591,596, filed Oct. 2, 1990, now abandoned.

FIELD OF THE INVENTION

The present invention pertains to the field of disk drives which are also called direct access storage devices (DASD) More More particularly, this invention pertains to the method and apparatus for positioning a read element or a write element over a data track for a disk drive.

BACKGROUND OF THE INVENTION

One of the key components of some electrical devices is a place to store and read data. For example, compact disk players read data, such as music, from a plastic disk. Another example is a VCR which reads data from a tape. Computer systems also store and read large amounts of data. Typically computer systems employ a number of storage means to store data. One of the places where a computer can store data is in a disk drive which is also called a direct access storage device.

Although this invention is not limited to a direct access storage device one will be described by way of example. A disk drive or direct access storage device includes several disks which look similar to records used on a record player or compact disks which are used in a CD player. The disks are stacked on a spindle, much like several records awaiting to be played. In a disk drive, however, the disks are mounted to the spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Each track in a disk drive is further subdivided into a number of sectors which is essentially just one section of the circumferential track.

Storage of data on a magnetic disk entails magnetizing portions of the disk in a pattern which represents the data. To store data on a disk the disk is magnetized. In order to magnetize the magnetic layer, a small ceramic block which contains a magnetic transducer known as a write element is passed over the surface of the disk. More specifically, the write element is flown at a height of approximately six millionths of an inch from the surface of the disk and is flown over the track as the write element is energized to various states causing the track below to be magnetized to represent the data to be stored.

To retrieve data stored on a magnetic disk, a read element is flown over the disk. The magnetized portions of the disk provide a signal from the read element. By looking at output from the read element, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read element and write element. This would be comparable to having a stereo that could play both sides of a record at once. Each side would have a stylus which played the particular side of the record.

Disk drives also have something that compares to the tone arm of a stereo record player. There are two types of disk drives, rotary and linear. Rotary disk drives have a tone arm that rotates much like a record player. The tone arm of a rotary disk drive, termed an actuator arm, holds all the transducers or read/write elements, one head for each surface of each disk supported in a structure that looks like a comb. Sometimes the structure is called an E block. Like a tone arm, the actuator arms rotate so that the read element end write element attached to the actuator arm can be moved to locations over various tracks on the disk. In this way, the write element can be used to magnetize the surface of the disk in a pattern representing the data at one of several track locations. The read element is used to detect the magnetized pattern on one of the tracks of a disk. For example, the needed data may be stored on two different tracks on one particular disk, so to read the magnetic representations of data, the actuator arm is rotated from one track to another track.

It should be noted that this invention is not limited to use in disk drives using magnetic media but is useful in any device having rotating media which uses a pair of transducers which pass over the rotating media. In this particular application, magnetic media is described as an example only. This invention would be useful in other storage devices which have different read elements and write elements.

Figure 3:
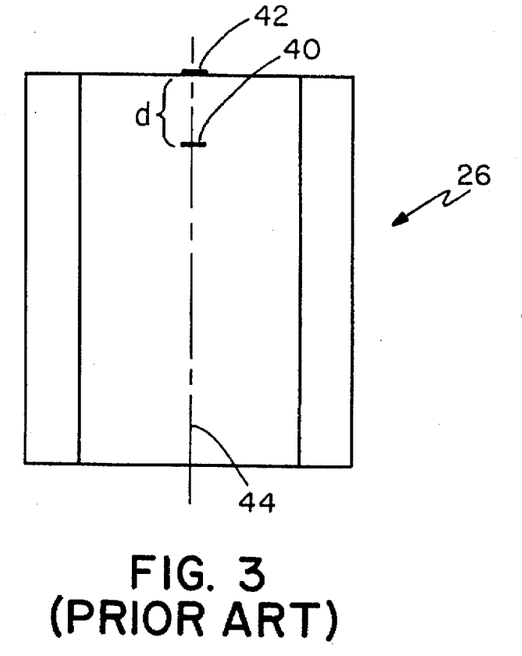
FIG. 3 is a bottom view of a slider showing a read element and a write element which are aligned along a radial from the actuator arm.
Figure 4:
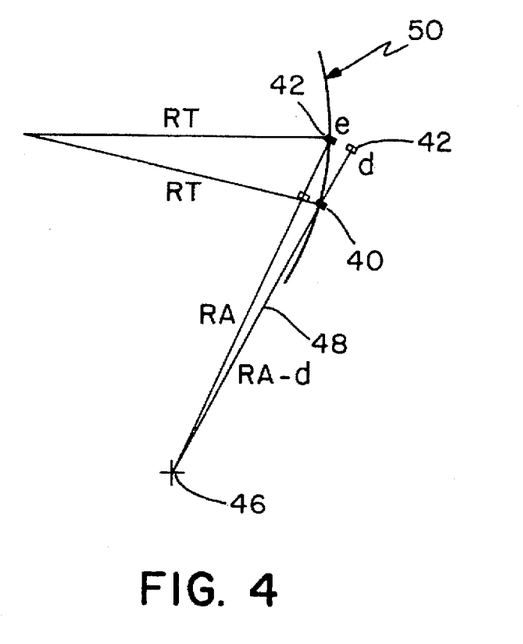
FIG. 4 is a schematic of the actuator arm with the read element and write element as shown in FIG. 2 attached.

The problem this invention addresses is most easily explained by showing the case of a rotary actuator as shown in FIGS. 3 and 4 of the drawings. FIG. 3 provides the background necessary to understand FIG. 4. FIGS. 3 shows a portion of the disk drive referred to as the slider 26 which holds a read element 40 and a write element 42. The slider 26 is attached to an actuator arm depicted by line 48 in FIG. 4. As can be seen from FIGS. 3 and 4, the read element 40 and the write element 42 are aligned either parallel to or along the longitudinal axis 44 of the slider. However, due to manufacturing misalignment tolerances the read element 40 and write element 42 may not be precisely aligned. Basically, the problem is that when either the read element or the write element is positioned over a particular track the other element is offtrack from track 50. The amount that one of the elements is offtrack varies as a function of the radius of the track in the case of a radial actuator being followed. This problem is known as track misregistration and can and will affect data integrity. Track misregistration must be corrected to allow track pitch or width to get smaller, and thus allow for increased track density without errors. Another problem is that repositioning between the write function and the read function on the track takes time and affects the data throughput rate of the disk drive.

In the case of a linear actuator which uses a slider as is shown in FIG. 3 which has the read element 40 aligned with the write element 42, the heads can still be misaligned due to manufacturing error. In addition, linear actuators may also have a carriage which may be difficult to mount perfectly so the read element 40 and the write element 42 remain on a tangent to the tracks of a disk 34. As a result, there is a possibility that the read element 40 can be tracking over a desired track in a disk drive while the write element 42 does not track over the same desired track. Again, this is track misregistration. It is important to minimize track misregistration to assure that the data is being read from or written to the desired track. It is also important since a well known goal in designing disk drive devices is to increase capacity. This translates into smaller track pitch or smaller track width. Thus, any problems with track misregistration must be overcome to allow increased capacity of disk drives. In addition, since the data throughput is affected there is a need for a method and apparatus that minimizes the distance an actuator must move to reposition the read or write element when switching from a write or read operation to the other operation on the same track. Since the amount of repositioning distance will vary as a function of the radius of the tracks on a disk drive and as a function of manufacturing tolerances, there is a need for a solution that minimizes the repositioning distance for all of the tracks in the disk drive.

SUMMARY OF THE INVENTION

Disclosed is a method and apparatus which allows for correction of track misregistration and which minimizes the repositioning distance needed to switch from a read operation to a write operation in a disk drive or other information storage and retrieval device which uses a separate read element and write element.

The actual offset of the read element with respect to the write element is measured which includes the manufacturing tolerances. The position offtrack that either the read element or write element is when the read and write element are aligned along the longitudinal axis of the slider can be mathematically described as a function of the cylinder position of the track. This distance is calculated using values measured and stored at the time the disk drive is manufactured and then summed with the read/write centerline offset so that the actual repositioning distance is then determined and the slider can then be repositioned.

In addition, the read element is intentionally offset at an angle from the write element rather than being aligned along the longitudinal axis of the slider for a rotary actuated disk drive. Of course, the write element could also be offset from the read element. The angle of offset is selected to minimize the distance necessary to move the actuator for any track on the disk drive. Since the repositioning distance is minimized the amount of time lost due to repositioning is minimized.

As a result, track misregistration can be minimized which allows for better data integrity and allows smaller track pitch. In addition, the slow down in throughput of data due to switching operations on a track can be minimized for a rotary actuator that uses a separate read element and write element.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
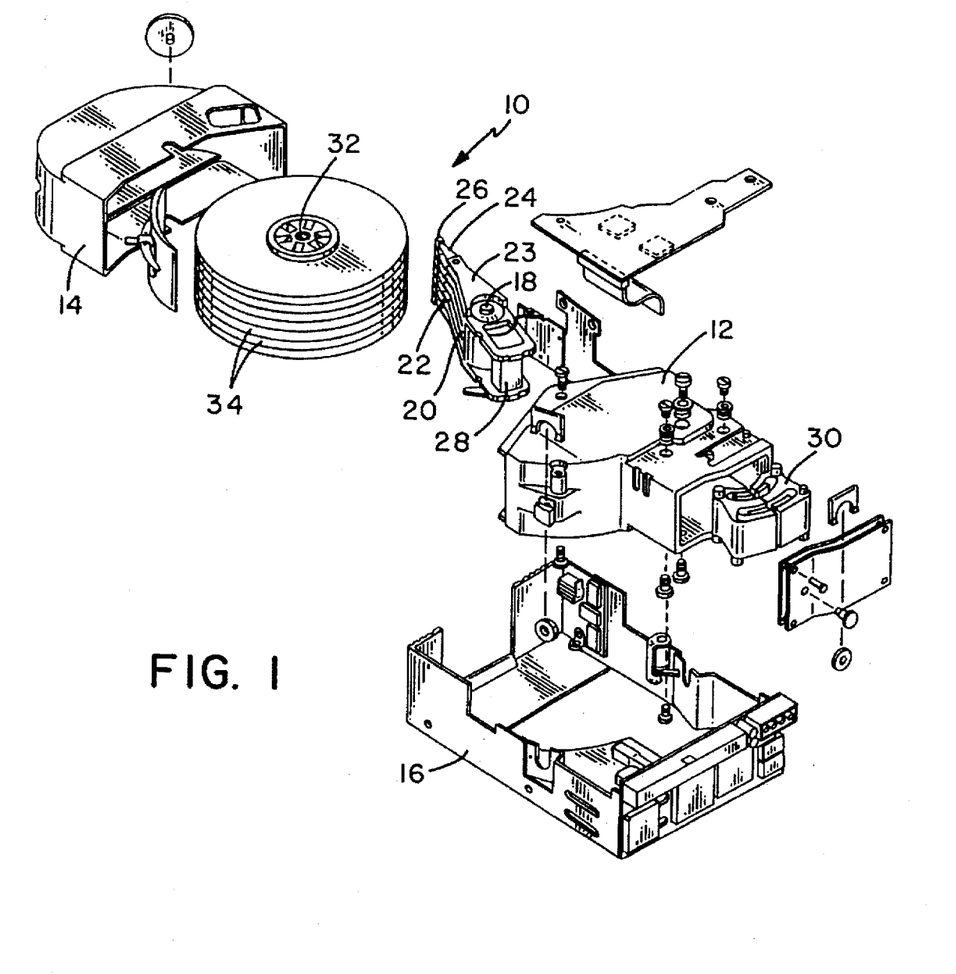
FIG. 1 is an exploded view of a disk drive.

The invention described in this application is useful with all mechanical configurations of disk drives or direct access storage devices ("DASD"). FIG. 1 is an exploded view of a disk drive 10. It should be noted that although a rotary actuator is shown the invention described herein is applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. Attached at the end of each load spring is a slider 26 which carries a pair of magnetic transducers (shown as a read element and a write element in FIGS. 3–7). On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted within the housing 12 is a spindle shaft 32. Rotatably attached to the spindle shaft 32 are a number of disks 34. In FIG. 1, eight disks are attached to the spindle shaft 32. As shown in FIG. 1, the disks 34 are attached to the spindle shaft 32 in spaced apart relation. An internal motor (not shown) rotates the disks 34.

Figure 2:
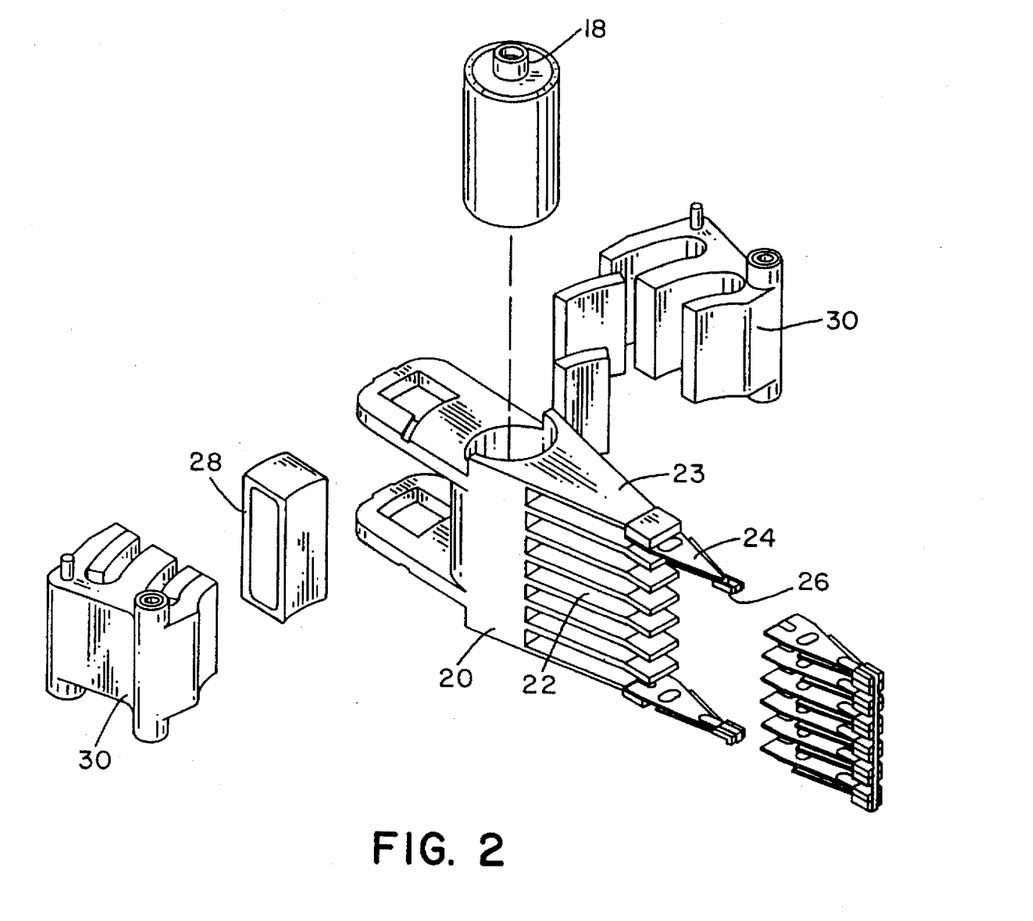
FIG. 2 is an exploded view of the actuator arm assembly.

FIG. 2 details the actuator arm assembly 20 in an exploded view. Each of the arms 23 of the E block or comb assembly 22, except the arms 23 on the top and bottom of the E block 22, carry two load springs. In this particular disk drive 10, there is a slider for both the top and bottom surface of each of the disks 34. The top and bottom arms 23 of the E block 22 have only one load spring 24 since these are used for the top surface of the top disk and the bottom surface of the bottom disk in the stack of disks 34. Attached to the load springs 24 are sliders 26 which include magnetic transducers which magnetize the surface of the disk 34 to represent and store desired data. As is well known in the art of disk drives, each of the disks has a series of concentric tracks onto which the magnetic information is recorded. The sliders 26 and the magnetic transducers incorporated therein are moved over the surface of a particular disk 34 so that a magnetic representation of data can be stored in any of the tracks on the disk 34. In this particular disk drive 10, the transducer movement is rotational and about the actuator shaft 18. Rotating the actuator arm assembly 20 causes the slider 26 and the transducer therein to be repositioned over surface of the disk 34.

FIG. 3 shows a slider 26 which has a read element or head 40 and a write element or head 42. The slider has a longitudinal axis 44. The read element 40 and the write element 42 are aligned along the longitudinal axis 44 of the slider 26 within a given manufacturing tolerance.

FIG. 4 is a schematic of a disk drive that uses the slider shown in FIG. 3. FIG. 4 includes the axis of rotation 46 of an actuator arm assembly about an actuator shaft. The actuator arm is shown schematically as line 48. In this particular figure the schematic actuator arm 48 is shown in two positions so as to illustrate a point that will be made in the next paragraph. The schematic actuator arm 48 includes the write element 42 and the read element 40 which are shown along line 48 and are separated by a distance d. The read element 40 and the write element 42 are shown on the schematic actuator arm depicted by line 48 since the axis of the slider 44 is co-linear in this example with the radial from the centerpoint of the axis of rotation 46 of the actuator arm assembly. In general the head is not required to be in line with the radial. FIG. 4 also shows a date track 50 which is on one of the disks 34 shown in FIG. 1. The data track 50 is at a radius RT from the center of the disk 34 (not shown in FIG. 4). The radius RT is shown to the write element 42 in one of the positions of the schematic arm depicted as line 48 and the radius of the track RT is also shown to the read element 40 in the second position of the schematic actuator arm 48.

As can be seen in FIG. 4, when the actuator arm is in a position where the write element 42 is positioned over the track 50 then the read element 40 is off of the track 50. FIG. 4 also shows that when the read element 40 is positioned over the track 50 the write element 42 is not positioned over the track 50. This presents problems when it is required to switch from a read operation to a write operation for data that is on the same track 50. To switch from reading with the read element 40 positioned over the track 50 to writing on the same track 50, the actuator arm 48 must be shifted to the position shown in FIG. 4 where the write element 42 is now positioned over the track 50. Rotating the actuator arm 48 between these two positions takes valuable time which affects the rate of throughput of data. One aspect of this particular invention deals with minimizing the amount of distance a slider on a rotary actuator is offtrack. More importantly, this invention deals with minimizing track misregistration.

Figure 5:
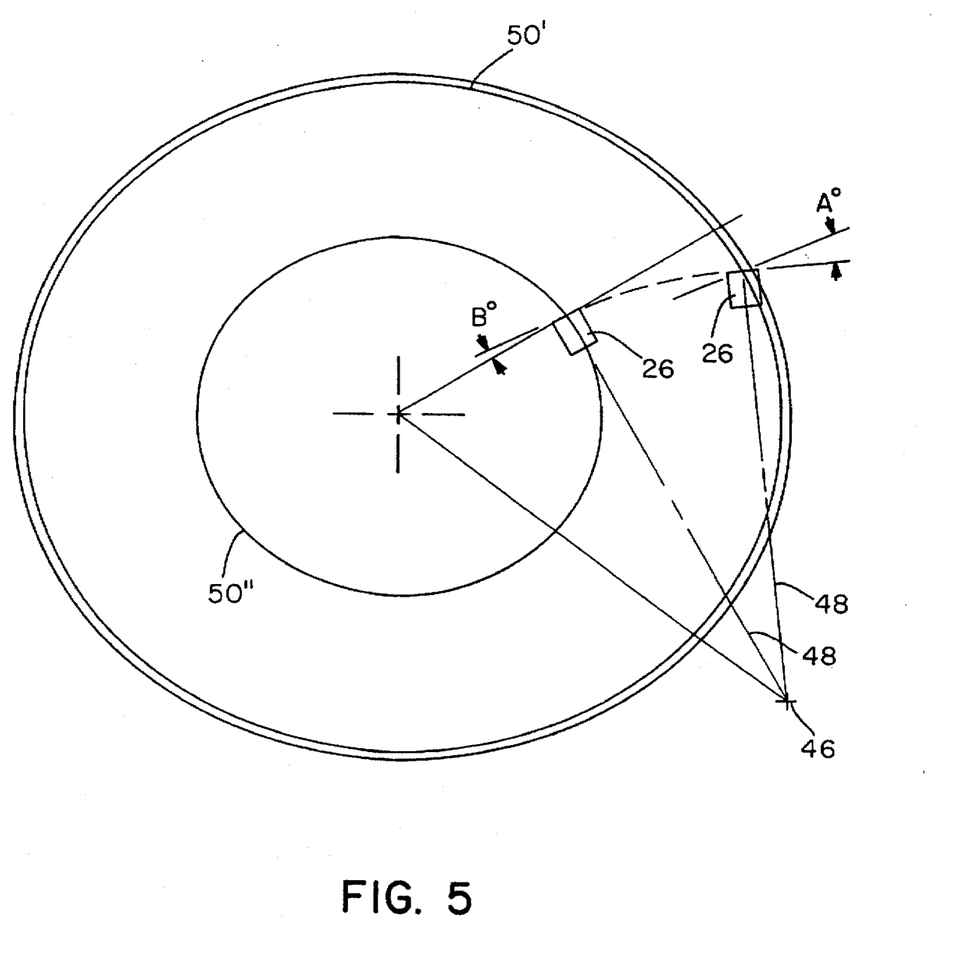
FIG. 5 is a top view of a disk with an actuator arm having a slider attached thereto shown schematically.

FIG. 5 deals with skew angles and shows that the skew angles vary as the actuator arm 48 crosses the disk 34. On a disk 34 there are a multiplicity of data tracks 50. Other tracks such as reference tracks are also typically written on a disk 34. In FIG. 5, the outermost data track 50' and the innermost data track 50" are shown. FIG. 5 also shows two positions of the schematic actuator arm 48. One of the positions of the actuator arm has the write element 42 at the back of the slider 26 tracking over track 50' and the other of these positions is with the write element 42 tracking over the track 50". The skew angle is the angle between a radial of the disk 34 through the midpoint of the back of the slider 26 and a line perpendicular to the longitudinal axis of the actuator arm 48. In FIG. 5, the skew angle A is associated with the slider 26 when it is positioned over track 50' and the skew angle B is associated with the slider 26 when it is positioned over track 50".

Simple geometry can also be used to find angles equalling the skew angle as defined above. For example, an angle equal to skew angle A occurs between the longitudinal axis of the load arm depicted as line 48 and a tangent to the track at the midpoint of the back of the slider 26 which contains the write element and which is positioned over the track. Knowing this it can be seen from FIG. 5 that for larger skew angles the offtrack distance between the read and write elements will be greater than for a smaller skew angle.

Figure 6:
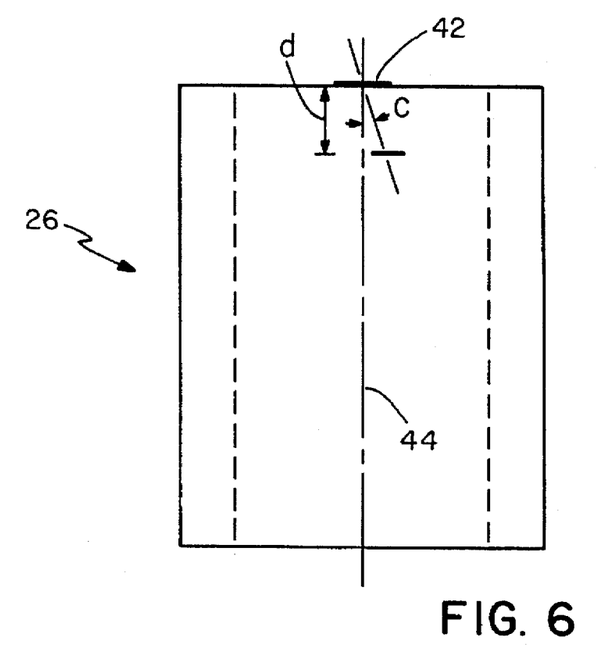
FIG. 6 is a top cutaway view of a slider with the write element on the radial from the actuator pivot point through the center of the slider and the read element offset therefrom.

FIG. 6 shows a slider 26 having the read element 40 positioned away from the longitudinal axis 44 of the slider 26. The view of the slider 26 shown in FIG. 6 is a cutaway view from the top of the slider 26. An angle C is defined by the angle between the sliders longitudinal axis 44 and a line 52 between the read element 40 and the write element 42.

Figure 7:
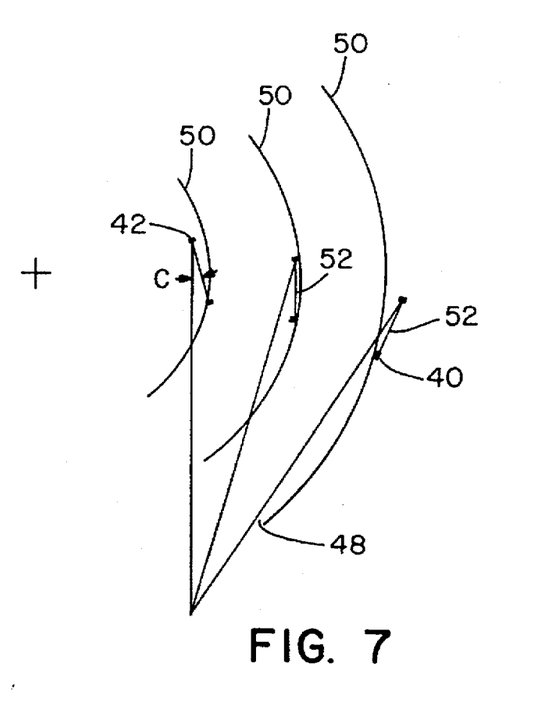
FIG. 7 is a schematic diagram similar to FIG. 5 for a slider with the write element offset from the read element.

Now turning to FIG. 7, the type of slider 26 shown in FIG. 6 is depicted in FIG. 7 as a straight line from the centerpoint of the axis of rotation for the actuator arm assembly 20 and then the line 52 making the same angle C between the read element 40 and the write element 42. By offsetting the write element 42 at an angle C from the read element 40 the distance that the write element 42 goes off track while the read element is tracking over a track 50 closer to the inner diameter or tracking over a track near the outer diameter is lessened considerably. By lessening the distance that the actuator must be moved to switch from a position where the read element 40 is tracking over the track 50 to a position when the write element 42 is tracking over the track 50, the time necessary for this change is also lessened which aids in data throughput. It should be noted that the angling of the write element with respect to the read element also produces the same benefits when switching from a write operation on a particular track to a read operation on a particular track.

The angle C can be selected to minimize the off track distance that either the read element 40 or the write element 42 is off track when the other head is in operation. When the angle is properly selected, the distance and time necessary for repositioning between reading with the read element 40 and writing with the write element 42 or vice versa is minimized in the disk drive for each position. Basically, the angle C in FIGS. 6 and 7 that will minimize the distance that the write element 42 will be off track when the read element 40 is following any track 50 on the disk is determined by measuring the skew angle A at the inner radius (track 50" in FIG. 5) and skew angle B at the outer radius (track 50' in FIG. 5). The value for angle C is that which minimizes the distance that the actuator arm must move for repositioning from a read operation to a write operation. Difference in various performance characteristics between the inner and outer data tracks may make the optimum angle C slightly different than the calculated angle C.

When the angle C is selected to minimize the distance which the actuator arm must move to switch between a write operation and a read operation or vice versa, at approximately midway between the track 50' at the outer diameter and the track 50" at the inner diameter, the read element 40 and the write element 44 will both pass over a track at the same time. At this track, no movement will be necessary to switch between reading with the read element 40 and writing with the write element 42.

As mentioned previously, when switching between reading and writing or vice versa, the actuator arm generally must be moved so that the head about to be used is positioned over the track. Even though the angle C has been optimized and set, there can be differences in the actual offset between the read element 40 and the write element 42 in a particular slider 26. There are many possible reasons the offset between the write element 42 and the read element 40 will not be the same as the offset associated with the angle C. Manufacturing tolerances will cause the actual offset to be slightly different. In addition, the physical center of a read element 40 or a write element 42 may not correspond to its magnetic center. These are just some of the factors that may cause the actual offset of the write element from the read element 40 to differ from the calculated case.

Trigonometry can be used to yield an essentially linear function which describes the distance off track a write element 42 is with respect to a read element 40 (as shown in FIGS. 3 and 4) while the read element is on track as a function of the particular cylinder. The cylinder location is defined by the servo tracks on the servo surface in the disk drive. The same linear function will describe the amount offtrack a read element is when the write element is on track as a function of the cylinder location except for the sign of the offset. To quicken the time necessary to move the actuator from a position where the read element 40 is over a track to a position where the write element 42 is over the same track the linear function is used to determine the amount of offtrack for the case where the read element and write element are aligned. This is a fast calculation as a constant is multiplied by the cylinder location. The actual offset as measured and stored for each head is then summed with the calculated result to determine the amount of distance the actuator must be moved to reposition the other element over the same track. Advantageously, the distance needed to move the actuator can be quickly determined which facilitates data throughput.

Figure 8:
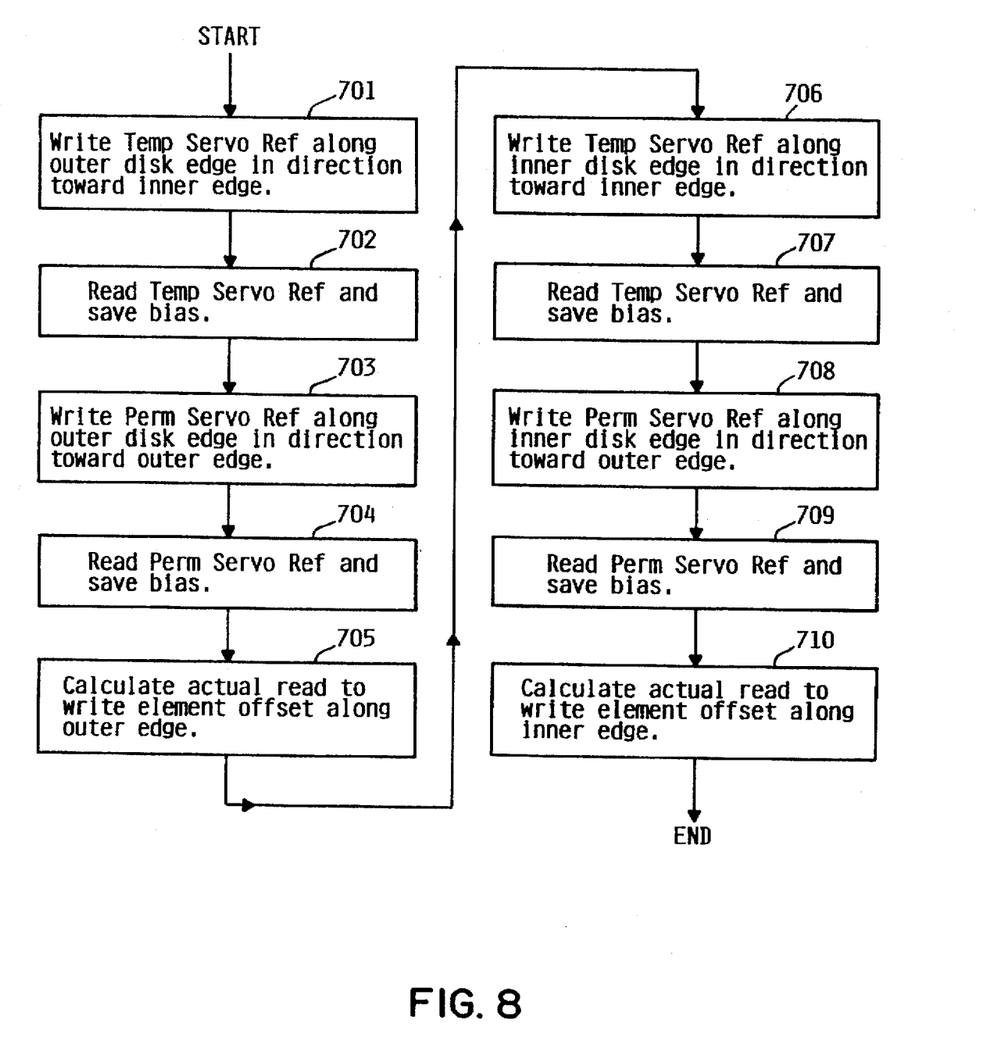
FIG. 8 shows the steps required to determine the actual offset of the read element from the write element in accordance with the preferred embodiment.

Determination of the actual offset of the write element 42 from the read element 40 is accomplished by writing temporary servo reference information along the edge of the disk 34 beyond the outer radius of the data region. The servo reference information is temporarily written from outer edge of a disk toward the inner radius of the disk 34 over a few tracks in the reference area 701. The servo reference information is then read using the read element and the amount of bias read by the read element 40 is retained 702. Writing from the outer edge toward the inner radius is considered moving in a positive direction.

The next step in determining the actual offset is to write permanent servo reference information toward the outer radius in the region of the disk beyond the data tracks 703. Again the read element 40 is then positioned to the center of the cylinder as defined by the servo tracks on the servo surface. The servo reference tracks are then read and the amount of bias is then observed and retained 704.

By writing the servo reference information initially in one direction and then in the other direction, the actual offset between the center of the read element and the center of the write element can be determined 705. In addition the total width of the write element can be determined.

The slider is then moved to a position near the inner diameter of the disk 34 and the above steps are repeated 706–709. Namely, a temporary servo reference track is initially written in one direction, then in the other. From this information the write width and the offset between the write element and the read element can be determined 710. The offset at the inner radius and the outer radius are significant due to the distance d between the read element and the write element and the angle the heads are rotated. Thus the difference in the offsets at the inner radius and the outer radius gives the effect due to the distance d. The offsets at the extremes are generally positive and negative in sign and are statistically comparable in magnitude.

It should be noted that this invention is applicable to any system having a separate read element and write element to minimize track misregistration. In addition, offsetting the read or write element can be used in any environment where a rotary actuator is used to access a circular or spiral track, such as flexible disks, optical disks or disks with magnetic layers.

The present invention and the best mode of practicing it have been described. It is to be understood that the foregoing description is illustrative only and that other means and techniques can be employed without departing from the full scope of the invention as described in the appended claims.

What we claim is:

1. A method for determining an amount of distance to move an actuator arm to correct for track misregistration when a slider attached to said actuator arm includes a separate read element and a separate write element which are separated by a distance d, which is the distance along a tangent to a track on a disk, said read element and write element used in a data recording device with a rotating media, said rotating media storing data in a plurality of discrete concentric tracks, said read element for reading information from a particular track of a plurality of tracks, said write element for writing information to a particular track, said actuator arm being pivoted about an axis parallel to the axis of rotation of said rotating magnetic media, wherein an offset between said read element and said write element in a direction radial to the axis of rotation of said disk varies with angular position of said actuator, said method comprising the steps of:

measuring the amount of said offset between said read element and said write element at a first position on a selected disk surface;

measuring the amount of said offset between said read element and said write element at a second position on a selected disk surface;

determining an adjustment distance to move said actuator arm from the amount of offset at said first position and the amount of offset at said second position, wherein said adjustment distance varies as a function of position of said actuator between said first position and said second position; and pivoting said actuator arm in response to the determined adjustment distance.

2. The method of claim 1, wherein said step of determining an adjustment distance comprises the steps of:

determining a constant and a multiplier to apply to a particular cylinder number to find the distance necessary for repositioning the actuator arm to correct for track misregistration, the constant and the multiplier determined from the measured amount of offset from the first position and the second position.

3. The method of claim 1 wherein the step of measuring the offset between a read element and a write element at a first position includes:

writing servo reference information in a first direction;

reading the servo reference information in a first direction;

writing servo reference information in a second direction, said second direction being opposite said first direction; and reading the servo reference information in a second direction.

4. The method of claim 3 wherein the step of determining the offset between the read element and the write element includes comparing the position error signal form the read element from the step reading the servo reference information in the first direction with the position error signal from the read element form the step reading the servo reference information in the second direction.

5. The method of claim 1 wherein the step measuring the offset at a first position is done at the outer edge of the disk and the step of measuring the offset at the second position is done at the inner radius of the disk.

6. A disk drive, comprising:

a housing;

a rigid disk rotatably attached to said housing, said rigid disk having at least one recording surface for recording data on a plurality of separate tracks;

an actuator assembly rotatably attached to said housing, said actuator assembly having an axis of rotation parallel to the axis of rotation of said rigid disk, said actuator assembly comprising at least one transducer head for reading and writing data on said at least one recording surface, said transducer head comprising a read element and a separate write element, said read element for reading information from a single desired track of a plurality of tracks on said at least one rigid disk, said write element for writing information to a single desired track of a plurality of tracks on said at least one rigid disk, said read and write elements being separated by a distance d, said actuator being rotated to position said transducer head at any one of said plurality of tracks, wherein, an offset between said read element and said write element on said transducer head is in a direction substantially radial to said disk, said offset varying with angular position of said actuator;

means for determining said offset between said read element and said write element on said transducer head, said offset being in a direction substantially radial to said disk when said transducer head is positioned at a plurality of different positions on said at least one recording surface of said disk, said offset being different at each of said plurality of different positions; and means for rotating said actuator assembly in response to the determined offset.

7. The disk drive of claim 6, wherein said means for determining said offset comprises:

means for measuring said offset when said transducer head is positioned at a first position on said disk;

means for measuring said offset when said transducer head is positioned at a second position on said disk; and means for determining said offset when said transducer head is positioned at a third position intermediate said first and second positions from values of said offset measured at said first and second positions.

8. A disk drive, comprising:

a housing;

at least one rigid disk rotatably attached to said housing, said rigid disk having at least one recording surface for recording data on a plurality of separate tracks;

an actuator assembly rotatably attached to said housing, said actuator assembly having an axis of rotation parallel to the axis of rotation of said rigid disk, said actuator assembly comprising at least one transducer head for reading and writing data on said recording surface, said transducer head comprising a read element and a separate write element, said read and write elements being separated by a distance d, said actuator being rotated to switch between a read head and a write head of said transducer head in response to switching from a read to a write operation at any one of said plurality of tracks on said at least one surface, wherein, an offset between said read element and said write element in a direction substantially radial to said disk varies with angular position of said actuator;

means for measuring an amount of said offset between said read element and said write element in a direction substantially radial to said disk at a first position on said disk;

adjustment means for adding an adjustment value to correct the angular position of said actuator when accessing data on a track, said adjustment value being determined from said amount of offset measured at said first position, wherein said adjustment value is dependent on the angular position of said actuator; and means for rotating said actuator assembly in response to the determined adjustment value to allow the transducer to read or write from any one of said plurality of tracks.

9. The disk drive of claim 8, further comprising:

means for measuring an amount of offset, in a direction substantially radial to said disk, between said read element and said write element at a second position on said disk;

wherein said adjustment means determines said adjustment value from said amounts of offset at said first and second positions.

10. The disk drive of claim 8 wherein said means for measuring an amount of offset at a first position comprises:

means for writing servo reference information in a first direction;

means for reading the servo reference information in said first direction;

means for writing servo reference information in a second direction, said second direction being opposite said first direction; and means for reading the servo reference information in said second direction.

11. A method for operating a rotating magnetic disk drive storage device, said rotating magnetic disk drive storage device having (a) at least one rigid disk rotatably attached to a housing, said rigid disk having at least one recording surface for recording data on a plurality of separate tracks, and (b) an actuator assembly rotatably attached to said housing, said actuator assembly having an axis of rotation parallel to the axis of rotation of said rigid disk, said actuator assembly comprising at least one transducer head for reading and writing data on said recording surface, said transducer head comprising a read element and a separate write element, said read and write elements being separated by a distance d, said actuator being rotated to position said transducer head for reading and writing data, said method for operating a rotating magnetic disk drive storage device comprising the steps of:

measuring an effective radial offset at a first position of said transducer, said effective radial offset representing a misregistration between said write element and said read element in a direction radial to the axis of rotation of said disk, said effective radial offset varying with angular position of said actuator;

calculating an effective radial offset at a second position of said transducer different from said first position, said calculating step using the effective radial offset value measured at said first position; and positioning said transducer to access data in a track located near said second position using said effective radial offset calculated by said calculating step.

12. The method for operating a rotating magnetic disk drive storage device of claim 11, wherein said step of measuring an effective radial offset at a first position of said transducer comprises the steps of:

writing first servo reference information at said first position in a first substantially radial direction;

reading said first servo reference information to obtain a first bias value;

writing second servo reference information at said first position in a second substantially radial direction, said second substantially radial direction being opposite said first substantially radial direction;

reading said second servo reference information to obtain a second bias value; and deriving said effective radial offset from said first and second bias values.

13. The method for operating a rotating magnetic disk drive storage device of claim 11, wherein said step of calculating an effective radial offset at a second position of said transducer comprises multiplying a cylinder number of said second position by a multiplier and adding a constant, at least one of said multiplier and said constant being derived from said effective radial offset value measured at said first position.

14. The method for operating a rotating magnetic disk drive storage device of claim 11, further comprising the step of:

measuring said effective radial offset at a third position of said transducer different from said first position and said second position, wherein said calculating step calculates said effective radial offset at said second position of said transducer using the effective radial offset value measured at said first position and the effective radial offset value measured at said third position.

15. The method for operating a rotating magnetic disk drive storage device of claim 14, wherein said step of measuring an effective radial offset at a first position of said transducer comprises the steps of:

(a) writing first servo reference information at said first position in a first substantially radial direction, (b) reading said first servo reference information to obtain a first bias value, (c) writing second servo reference information at said first position in a second substantially radial direction, said second substantially radial direction being opposite said first substantially radial direction, (d) reading said second servo reference information to obtain a second bias value, and (e) deriving said effective radial offset at said first position from said first and second bias values; and wherein said step of measuring an effective radial offset at a third position of said transducer comprises the steps of:

(a) writing third servo reference information at said third position in a first substantially radial direction;

(b) reading said third servo reference information to obtain a third bias value;

(c) writing fourth servo reference information at said third position in a second substantially radial direction, said second substantially radial direction being opposite said first substantially radial direction;

(d) reading said fourth servo reference information to obtain a fourth bias value; and (e) deriving said effective radial offset at said third position from said third and fourth bias values.

16. The method for operating a rotating magnetic disk drive storage device of claim 14, wherein said step of calculating an effective radial offset at a second position of said transducer comprises multiplying a cylinder number of said second position by a multiplier and adding a constant, said multiplier and said constant being derived from said effective radial offset values measured at said first position and said third position.

17. A method for calibrating an effective radial offset of a rotating magnetic disk drive storage device, said rotating magnetic disk drive storage device having (a) at least one rigid disk rotatably attached to a housing, said rigid disk having at least one recording surface for recording data on a plurality of separate tracks, and (b) an actuator assembly rotatably attached to said housing, said actuator assembly having an axis of rotation parallel to the axis of rotation of said rigid disk, said actuator assembly comprising at least one transducer head for reading and writing data on said recording surface, said transducer head comprising a read element and a separate write element, said read and write elements being separated by a distance d, said actuator being rotated to position said transducer head for reading and writing data, said effective radial offset representing a misregistration between said write element and said read element in a direction radial to the axis of rotation of said disk, said effective radial offset varying with angular position of said actuator, said method for calibrating a rotating magnetic disk drive storage device comprising the steps of:

writing first servo reference information at a first transducer position in a first substantially radial direction;

reading said first servo reference information to obtain a first bias value;

writing second servo reference information at said first transducer position in a second substantially radial direction, said second substantially radial direction being opposite said first substantially radial direction;

reading said second servo reference information to obtain a second bias value; and deriving said effective radial offset at said first transducer position from said first and second bias values.

18. A method for calibrating an effective radial offset of a rotating magnetic disk drive storage device of claim 17, further comprising the steps of:

writing third servo reference information at a second transducer position in a first substantially radial direction;

reading said third servo reference information to obtain a third bias value;

writing fourth servo reference information at said second transducer position in a second substantially radial direction, said second substantially radial direction being opposite said first substantially radial direction;

reading said fourth servo reference information to obtain a fourth bias value;

deriving said effective radial offset at said second transducer position from said third and fourth bias values; and deriving at least one coefficient for calculating an effective radial offset at a third transducer position intermediate said first and second positions, said at least one coefficient being derived from said effective radial offset at said first transducer position and said effective radial offset at said second transducer position.

* * * * *

UNITED STATES PATENT AND TRADEMARK OFFICE
CERTIFICATE OF CORRECTION

PATENT NO. : 5,682,274

DATED : Oct. 28, 1997

INVENTOR(S) : Dana Henry Brown et al.

It is certified that error appears in the above-identified patent and that said Letters Patent is hereby corrected as shown below:

Claim 7, Col. 9, Line 33, "chive" should read --drive--.

Signed and Sealed this

Tenth Day of February, 1998

Attest:

BRUCE LEHMAN

*Attesting Officer*    *Commissioner of Patents and Trademarks*